United States Patent Office 3,310,367
Patented Mar. 21, 1967

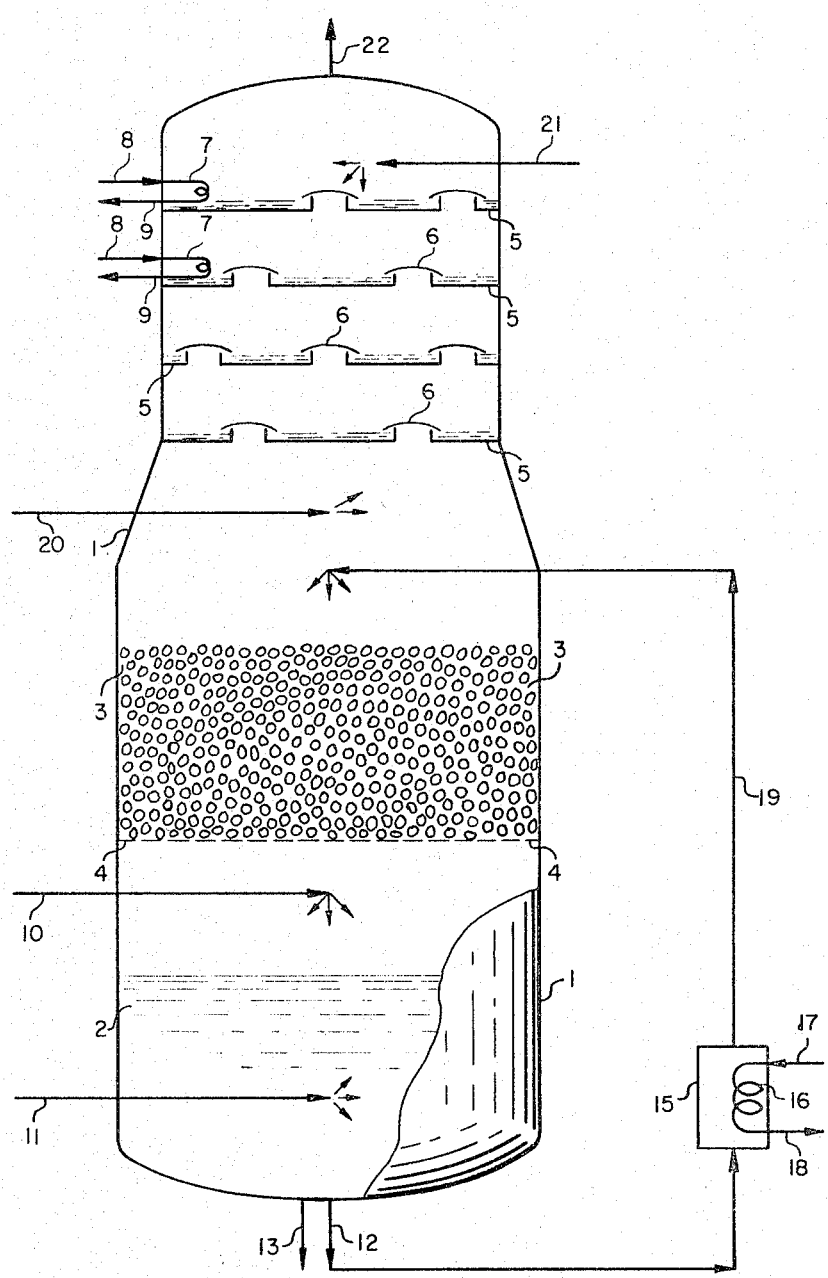

3,310,367
PROCESS AND APPARATUS FOR THE PRODUCTION OF AMMONIUM CARBONATE
Ivo Mavrovic, New York, N.Y., assignor to Chemical Construction Company, New York, N.Y., a corporation of Delaware
Filed May 22, 1964, Ser. No. 369,511
11 Claims. (Cl. 23—61)

This invention relates to the production of ammonium carbonate solution, by the reaction of ammonia and carbon dioxide in the presence of water. An improved process and apparatus are provided, by means of which ammonium carbonate is efficiently produced without loss of free ammonia.

The exothermic reaction between ammonia and carbon dioxide in the presence of excess water, to produce ammonium carbonate is readily attained in practice. The reaction is as follows:

(1) $\quad 2NH_3 + CO_2 + H_2O \rightarrow (NH_4)_2CO_3$

When a deficiency of water is present, the ammonia and carbon dioxide may combine to form ammonium carbamate, as follows:

(2) $\quad 2NH_3 + CO_2 \rightarrow NH_4COONH_2$

In the process description and claims presented infra, when a process stream is referred to as aqueous ammonium carbonate solution, it will be understood that this process stream may contain a proportion of dissolved ammonium carbamate as well as ammonium carbonate.

Reactions (1) and (2) are exothermic and readily go to completion in practice, however a residual proportion of unreacted ammonia is always present and constitutes a process loss. This is particularly true when the source materials for the ammonia and carbon dioxide consist of dilute gas streams containing a minor proportion of ammonia or carbon dioxide plus inerts. Typically, coke oven gas containing carbon monoxide as a principal constituent may be employed as a source of ammonia, while carbon dioxide may be derived from flue gas which contains a major proportion of nitrogen. The reactant streams are brought into contact, usually within a body of aqueous ammonium carbonate solution, and it will be appreciated that the residual unabsorbed gas phase will contain a small but valuable component of unabsorbed ammonia. Thus, U.S. Patent No. 2,690,431 provides a method for producing aqueous ammonium carbonate solutions, in which the vent gases from the carbon dioxide absorption column contain 0.05 pound ammonia/minute, based on an input to the column of 12 pounds carbon dioxide/minute contained in stack gas. It is evident that an ammonia content of this magnitude in the vent gases would constitute a substantial loss in a large-scale facility, in which tonnage quantities of product solution were produced.

Aqueous ammonium carbonate solution may be profitably utilized in several applications. The solution may simply be concentrated and crystallized, to yield solid ammonium carbonate as a final product. Another alternative usage for the solution is in the leaching of metals from ores. Aqueous ammonium carbonate solution containing a substantial proportion of ammonium carbamate may be profitably utilized in the high pressure synthesis of urea, with suitable addition of excess ammonia. Finally, the aqueous ammonium carbonate solution may be reacted with gypsum, to produce a solution of ammonium sulfate and solid calcium carbonate, in accordance with the following equation:

(3) $\quad (NH_4)_2CO_3 + CaSO_4 \rightarrow (NH_4)_2SO_4 + CaCO_3$ (solid)

The ammonium sulfate solution is readily filtered from the solid calcium carbonate, and is then concentrated and crystallized to produce solid ammonium sulfate fertilizer.

In the present invention, aqueous ammonium carbonate solution is produced in a novel manner. The input feed stream of ammonia is reacted with a first stream of carbon dioxide within a body of aqueous ammonium carbonate solution. A major portion of the ammonia is thus converted to ammonium carbonate in situ, however a gas stream is also produced which contains residual unabsorbed ammonia and inerts. A first portion of the aqueous ammonium carbonate solution is withdrawn as product, while a second portion of the solution is withdrawn, cooled in a heat exchanger to increase its absorptive capacity for ammonia, and then employed to scrub the gas stream in gas-liquid contact means. The second portion of solution containing dissolved ammonia is then added to the main body of aqueous ammonium carbonate solution. The residual gas stream, containing a small proportion of unabsorbed ammonia, is then mixed with a second stream of carbon dioxide gas. The gas mixture is then cooled and refluxed, together with added liquid water, to produce a complete condensation of ammonia as dissolved ammonium carbonate. The liquid phase from the reflux section is added to the main body of aqueous ammonium carbonate solution, while the residual gaseous phase free of ammonia and consisting of carbon dioxide plus inerts is either discharged or passed to other utilization.

The procedure of the present invention possesses several advantages. Complete recovery of ammonia as ammonium carbonate is attained due to total removal of ammonia from the gas phase. The process may be operated to obtain concentrated ammonium carbonate-carbamate solutions, while completely preventing the loss of ammonia which usually occurs when such concentrated solutions are produced. Finally, dilute gas streams containing a minor proportion of ammonia such as coke oven gas or the off-gas from urea synthesis may be efficiently processed for complete ammonia recovery.

It is an object of the present invention to produce ammonium carbonate in an improved manner.

Another object is to efficiently produce aqueous ammonium carbonate solution using dilute gas streams.

A further object is to produce aqueous ammonium carbonate solution by the reaction between ammonia and carbon dioxide in the presence of water.

An additional object is to completely prevent the loss of ammonia during reaction with carbon dioxide-containing gas streams to produce ammonium carbonate.

Still another object is to produce concentrated aqueous ammonium carbonate solutions containing ammonium carbamate from ammonia and carbon dioxide while avoiding ammonia loss.

Still a further object is to provide an improved apparatus for the reaction of ammonia and carbon dioxide in the production of aqueous ammonium carbonate solution.

These and other objects and advantages of the present invention will become evident from the description which follows. Referring to the figure, a preferred embodiment of the process and apparatus of the invention is presented. The main reaction vessel 1 is provided with a lower reservoir chamber containing a body of aqueous ammonium carbonate solution 2. A packed section or bed 3 is provided in the middle section of vessel 1 above the reservoir chamber containing solution 2. Bed 3 consists of ceramic shapes such as solid balls, Raschig rings or saddles which promote gas-liquid contact. Packing bed 3 is retained and supported on grid 4, which provides for vertical fluid flow. In the upper portion of vessel 1, a gas reflux section is provided, consisting of reflux plates or trays 5 holding condensed reflux liquor and bubble caps 6 for gas-liquid contact. Cooling coils 7 are provided on the trays 5 to cool the reflux liquor, with cooling water or a refrigerant such as Freon being admitted via 8 and removed via 9.

In operation of the process of the present invention, an input ammonia feed stream 10 consisting in this case of liquid ammonia is passed into vessel 1 above the solution 2, and is sprayed onto the surface of the liquid body 2. A first input stream 11 consisting of gaseous carbon dioxide is sparged into the body of solution 2, and in situ exothermic reaction between streams 10 and 11 with formation of ammonium carbonate or ammonium carbamate takes place within solution 2. Operating conditions in the reservoir chamber will generally consist of a temperature in the range of 15° C. to 120° C. and a pressure in the range of 15 p.s.i.a. to 200 p.s.i.a., although process conditions outside these ranges may be adopted in practice. A portion of solution 2 is withdrawn from vessel 1 as stream 13. Stream 13 is product aqueous ammonium carbonate solution, and is passed to product utilization as described supra.

An additional portion of solution 2 is withdrawn as stream 12, and is passed into heat exchanger 15, wherein the liquid solution is cooled to a final temperature preferably at least 10° C. below the initial temperature of stream 12. Exchanger 15 is provided with cooling coil 16, and cooling water or other cooling medium is passed into coil 16 via 17 and withdrawn via 18. The cooled liquid solution stream 19 is passed from heat exchanger 15 into reaction vessel 1, and is sprayed into bed 3 for gas-liquid contact. The reaction between streams 10 and 11 in solution 2 generates a gas stream containing unabsorbed ammonia, particularly when inerts are present in the feed stream, as when stream 11 consists of flue gas. The rising gas stream from the lower reservoir section passes through packed bed 3, and is cooled and scrubbed by contact with downflowing cold liquid solution 19. A major portion of the residual ammonia is thus absorbed into the liquid phase in bed 3, and the downflowing liquid joins the main body of solution 2.

The residual gas phase, now with only a minor content of ammonia, flows upwards from bed 3 and is mixed with stream 20, which is a second gaseous stream of carbon dioxide. The mixed gas stream now passes upwards in vessel 1, through the upper gas reflux section provided with reflux plates or trays 5 having bubble caps 6. The rising gas stream is cooled and refluxed, preferably to a final temperature below 100° C., and all of the residual ammonia is absorbed in the liquid phase on trays 5 as ammonium carbonate. The trays are provided with cooling means such as cooling coils 7 which contain cooling medium such as chilled water or refrigerant admitted via 8 and withdrawn via 9. Liquid water is admitted to an upper tray such as the top tray via 21, and provides the water necessary for ammonium carbonate formation.

The liquid phase from trays 5 flows downward in vessel 1 and joins the main body of aqueous ammonium carbonate solution 2. In this procedure, due to the cooling and reflux of the gas stream containing a minor amount of ammonia plus added carbon dioxide, only a minimal amount of water is required for complete recovery of ammonia. Thus, the total water feed to the system is substantially lowered, and it is possible to completely recover the ammonia while producing concentrated ammonium carbonate-carbamate solution as a final discharge product solution 13.

The final residual gas stream containing carbon dioxide and inerts is discharged from the top of vessel 1 via stream 22. Stream 22 may be vented through a pressure control valve, not shown, or may be passed to further utilization.

Numerous alternatives within the scope of the present invention will occur to those skilled in the art. Thus, in cases where the carbon dioxide is available as a liquid, as an alternative to preliminary vaporization the liquid carbon dioxide may be sprayed onto the surface of solution 2 similarly to stream 10. In addition, when the feed ammonia is available in the gaseous state, such as a component of coke oven gas or urea synthesis off-gas, the gaseous ammonia-containing feed stream may be sparged into solution 2 similarly to stream 11.

Other means for gas-liquid contact may be provided as an alternative to packed bed 3. Such means could consist of a plurality of sieve trays, however this type of apparatus is generally more expensive although more efficient contact may be attained.

In any alternative arrangement, a critical aspect of the present invention resides in the provision of a second stream of carbon dioxide which is added to the residual gas stream from the middle gas-liquid contact section, followed by cooling and reflux of the mixed gas stream for total recovery of residual ammonia as aqueous ammonium carbonate solution.

An example of an industrial application of the present invention will now be described.

*Example*

A liquid ammonia feed stream was sprayed into a body of aqueous ammonium carbonate solution, which was at a temperature of 80° C. and pressure of 45 p.s.i.a. The liquid ammonia was at a temperature of 25° C., and the ammonia feed rate was 100 mols/hour. Filtered flue gas at temperature of 175° C. was sparged into the liquid solution, and contained the following major components (mols/hour): 80 carbon dioxide, 8 carbon monoxide, 340 nitrogen and 13 water vapor. A first portion of liquid solution containing ammonium carbonate was withdrawn as product solution at a rate of 12.5 gallons/minute, and contained 50 mols carbon dioxide, 100 mols ammonia and 146 mols water. A second portion of the solution was withdrawn at a rate of 230 gallons/minute, cooled from 80° C. to 65° C., and recycled above the packed section. The rising gas phase above the packed section was at a temperature of 70° C. and contained, in mols/hour, 30 carbon dioxide, 8 carbon monoxide, 340 nitrogen, 22 water vapor and 2 residual ammonia. A second stream of filtered flue gas having the same composition as the first stream was added to the gas phase above the packed section, at a total molar flow rate of 55 mols/hour. The combined rising gas phase was cooled and refluxed to a final temperature of 15° C., with the addition of 137 mols/hour of liquid water above the reflux section. The final gas phase discharged above the reflux section contained less than 10 p.p.m. of ammonia under steady state operating conditions. Final gas phase composition, in mols/hour, was 40 carbon dioxide, 9 carbon monoxide, 382 nitrogen, and 4 water vapor.

I claim:

1. Process for the production of ammonium carbonate solution which comprises reacting a feed stream comprising ammonia with a first stream comprising carbon dioxide in an aqueous ammonium carbonate solution, whereby a gas stream containing residual unabsorbed ammonia is produced, withdrawing a first liquid stream of said solution as product ammonium carbonate solution, withdrawing a second liquid stream of said solution, cooling said second liquid stream, scrubbing said gas stream containing residual unabsorbed ammonia with said cooled second liquid stream, whereby a major portion of said residual unabsorbed ammonia is absorbed into said second liquid stream, combining said second liquid stream containing absorbed ammonia with said aqueous ammonium carbonate solution, adding a second stream comprising carbon dioxide to the residual gas stream from said scrubbing step, cooling and refluxing the mixed gas stream, adding sufficient liquid water to the gas stream during said refluxing step to dissolve residual ammonia into the liquid reflux phase as ammonium carbonate, and removing a residual gas stream containing carbon dioxide and free of ammonia from said refluxing step.

2. Process of claim 1, in which said feed stream comprising ammonia consists of coke oven gas.

3. Process of claim 1, in which said feed stream comprising ammonia consists of urea synthesis off-gas.

4. Process of claim 1, in which said first and second streams comprising carbon dioxide consist of flue gas.

5. Process for the production of ammonium carbonate solution which comprises sparging a first stream of gaseous carbon dioxide into an aqueous ammonium carbonate solution, spraying a liquid feed stream of ammonia onto the surface of said solution, whereby a gas stream containing residual unabsorbed ammonia is produced, withdrawing a first liquid stream of said solution as product ammonium carbonate solution, withdrawing a second liquid stream of said solution, cooling said second liquid stream, scrubbing said gas stream containing residual unabsorbed ammonia with said cooled second liquid stream, whereby a major portion of said residual unabsorbed ammonia is absorbed into said second liquid stream, combining said second liquid stream containing absorbed ammonia with said aqueous ammonium carbonate solution, adding a second stream of gaseous carbon dioxide to the residual gas stream from said scrubbing step, cooling and refluxing the mixed gas stream, adding sufficient liquid water to the gas stream during said refluxing step to dissolve residual ammonia into the liquid reflux phase as ammonium carbonate, and removing a residual gas stream containing carbon dioxide and free of ammonia from said refluxing step.

6. Process of claim 5, in which said liquid water is provided in an amount less than the equilibrium requirement for complete formation of ammonium carbonate from the reaction between said first stream of gaseous carbon dioxide and said liquid feed stream of ammonia, whereby said aqueous ammonium carbonate solution contains dissolved ammonium carbamate.

7. Process for the production of ammonium carbonate solution which comprises sparging a first stream comprising gaseous carbon dioxide into an aqueous ammonium carbonate solution at a temperature in the range of 15° C. to 120° C. and a pressure in the range of 15 p.s.i.a. to 200 p.s.i.a., spraying a liquid feed stream of ammonia onto the surface of said solution, whereby a gas stream containing residual unabsorbed ammonia is produced, withdrawing a first liquid stream of said solution as product ammonium carbonate solution, withdrawing a second liquid stream of said solution, cooling said second liquid stream to a final temperature at least 10° C. below the initial temperature, scrubbing said gas stream containing residual unabsorbed ammonia with said cooled second liquid stream, whereby a major portion of said residual unabsorbed ammonia is absorbed into said second liquid stream, combining said second liquid stream containing absorbed ammonia with said aqueous ammonium carbonate solution, adding a second stream comprising gaseous carbon dioxide to the residual gas stream from said scrubbing step, cooling and refluxing the mixed gas stream to a final temperature below 100° C., adding sufficient liquid water to the gas stream during said refluxing step to dissolve residual ammonia into the liquid reflux phase as ammonium carbonate, and removing a residual gas stream containing carbon dioxide and free of ammonia from said refluxing step at a temperature below 100° C.

8. Process of claim 7, in which said first and second gas streams comprising carbon dioxide consist of flue gas.

9. Apparatus for the production of ammonium carbonate solution by reaction of ammonia and carbon dioxide which comprises a reaction vessel, said vessel having a lower reservoir chamber containing aqueous ammonium carbonate solution, means for gas-liquid contact within said vessel above said reservoir chamber, a gas reflux section within said vessel above said means for gas-liquid contact, said gas reflux section being provided with bubble cap trays and means for gas cooling, means to admit ammonia and a first stream of carbon dioxide into said reservoir chamber, means to withdraw a first stream of product aqueous ammonium carbonate solution from said reservoir chamber, a heat exchanger external to said reaction vessel, means to pass a second stream of aqueous ammonium carbonate solution from said reservoir chamber through said heat exchanger, whereby said second stream of aqueous ammonium carbonate solution is cooled, means to return said cooled aqueous ammonium carbonate solution into said reaction vessel above said means for gas-liquid contact, means to admit a second stream of carbon dioxide into said reaction vessel between said means for gas-liquid contact and said gas reflux section, means to admit liquid water into said gas reflux section, and means above said gas reflux section to remove excess gaseous carbon dioxide free of ammonia.

10. Apparatus of claim 9, in which said means for gas-liquid contact is a section provided with solid particulate packing.

11. Apparatus of claim 9, in which said means for gas-liquid contact consists of a plurality of sieve trays.

References Cited by the Examiner
UNITED STATES PATENTS

| | | | |
|---|---|---|---|
| 1,897,725 | 2/1933 | Gaus et al. | 23—63 |
| 2,004,799 | 6/1935 | Richardson | 23—283 X |
| 2,690,431 | 9/1954 | Babbitt et al. | 23—61 X |

OSCAR R. VERTIZ, *Primary Examiner.*

G. T. OZAKI, *Assistant Examiner.*